No. 809,792. PATENTED JAN. 9, 1906.
J. P. EUSTIS.
PIPE COUPLING.
APPLICATION FILED DEC. 2, 1904.
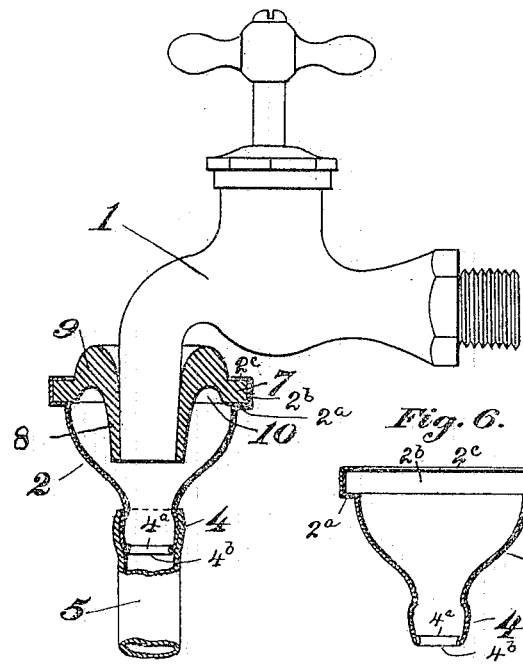
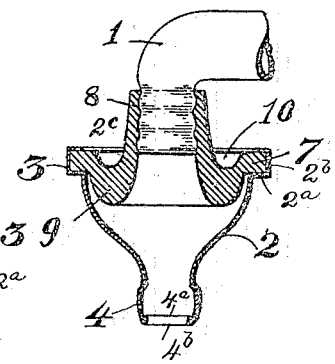
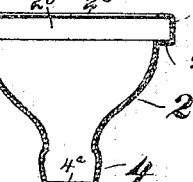
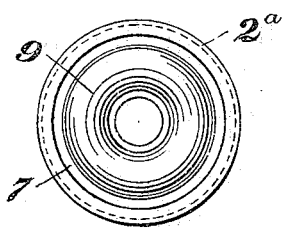
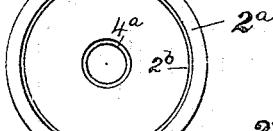
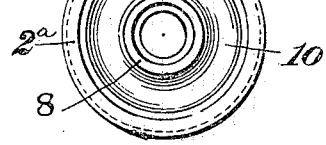
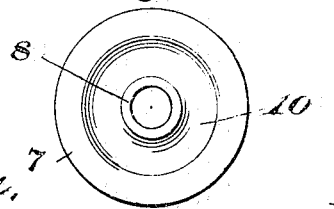
Witnesses.
C. B. Choate.
Rich'd Boylston Hall.
Inventor;
John P. Eustis.
by N. C. Lombard
Attorney.

UNITED STATES PATENT OFFICE.

JOHN P. EUSTIS, OF NEWTON, MASSACHUSETTS.

PIPE-COUPLING.

No. 809,792.

Specification of Letters Patent.

Patented Jan. 9, 1906.

Application filed December 2, 1904. Serial No. 235,137.

*To all whom it may concern:*

Be it known that I, JOHN P. EUSTIS, a resident of Newton, in the county of Middlesex and State of Massachusetts, have invented a new and useful Improvement in Pipe-Couplings, of which the following, taken in connection with the accompanying drawings, is a specification.

My invention relates to pipe-couplings for connecting flexible pipes to the smooth discharge ends of faucets and other like articles; and it consists in a novel feature of construction, arrangement, and combination of parts, which will be readily understood by reference to the description of the accompanying drawings, and to the claims hereto appended, and in which my invention is clearly pointed out.

Figure 1 of the drawings represents a central longitudinal section of my improved coupling applied to an ordinary basin-faucet. Fig. 2 is a plan of the coupling detached from the faucet. Fig. 3 is a central longitudinal section of my coupling with the rubber packing reversed and applied to a faucet having a short nozzle. Fig. 4 is a plan of the same. Figs. 5 and 6 are respectively a plan and a central longitudinal section of the metal casing, and Figs. 7 and 8 are respectively an inverted plan and a central section of the rubber packing.

In the drawings, 1 represents an ordinary basin-faucet having a smooth or unthreaded nozzle.

A metallic casing 2, having an exterior outline somewhat resembling a pear, is formed from a single piece of sheet metal, though it may be formed in two pieces, if desired, said two parts being brazed or soldered together, so as to be, in effect, one piece of metal when completed. The larger end of said casing has formed in its inner periphery the rectangular groove 3, providing an inner flange 2ª, an annular rim 2ᵇ, and an outer flange 2ᶜ, and its smaller end has a contracted portion thereof slightly expanded, as shown at 4 in Figs. 1, 3, and 4, to receive and hold one end of a flexible pipe 5, which may have secured to its other end a shampoo or shower-bath sprinkler in a well-known manner, or said flexible pipe may be connected at its other end to another fixed metallic pipe for the purpose of conveying liquid from said faucet to any desired receptacle. The expanded portion 4 terminates in an infolded reinforcing internal flange 4ª to provide a rounded extremity 4ᵇ to the casing. A rubber packing comprising the annular flange 7, the tapering tubular section 8, the annular convex portion 9, and the opposing annular concave surface 10 has its flange 7 inserted in said annular groove 3, as shown in Figs. 1 and 3.

A great variety of different sizes and forms of faucets are in common use, some having long smooth nozzles, others having quite short nozzles, and each style varying largely in size, the majority of them having circular outlets, while others have oval or elliptical outlets, and therefore it is quite desirable that a coupling for connecting a flexible tube or pipe thereto should cover as wide a range of sizes and shapes as possible. This has been accomplished by my invention, as a coupling such as shown in the drawings will work successfully upon faucets having discharge-nozzles three-eighths of an inch in diameter or from that up to seven-eighths of an inch in diameter will fit equally well upon circular or oval nozzles, and by reversing the rubber packing it may be successfully used upon short nozzles, as shown in Fig. 3.

In all slip-joint couplings in which an elastic gripping contact-surface was employed and that has heretofore been in use prior to my present invention and in which a double-flanged metal case was employed to hold the packing, so far as my knowledge extends, the metallic case was made in two parts, comprising a main body provided with a seat to support the packing and with an exterior screw-thread and a clamping-ring threaded internally and fitted to the screw-thread on the exterior of said main body, so as to clamp the outer edge of said rubber between said seat on the main body and said clamping-ring. By my invention the cost of construction of the metal casing is very materially reduced, because of dispensing with the threaded connections between the two parts constituting the metal casing as heretofore constructed, and the rubber packing can be readily placed in position with its flange 7 entering and filling the annular groove 3, as shown in Fig. 1, or removed therefrom and reinserted in the position shown in Fig. 3 without the employment of tools, which is an important advantage. The act of inserting the faucet-nozzle or other pipe into the tapering opening of said packing tends to force the flange 7 into close contact with the peripheral wall of said groove 3, and thus prevent leakage around said flange, and the pressure of liquid in the casing not only aids in forcing said flange into said groove, but also forces the frusto-conical tubular section 8 into firmer contact with the nozzle or pipe to which it is applied.

The operation of my invention will be understood from the foregoing without further description here.

What I claim as new, and desire to secure by Letters Patent of the United States, is—

1. A pipe-coupling comprising a metallic casing formed in one piece with a rectangular internal groove, providing an inner flange, an annular rim and an outer flange, and a contracted portion having a slightly-expanded end.

2. A pipe-coupling comprising a metallic casing formed in one piece with a rectangular internal groove providing an inner flange, an annular rim and an outer flange, and a contracted portion having a slightly-expanded end which terminates in an infolded reinforcing internal flange providing a rounded extremity to the casing.

In testimony whereof I have signed my name to this specification, in the presence of two subscribing witnesses, on this 30th day of November, A. D. 1904.

JOHN P. EUSTIS.

Witnesses:
N. C. LOMBARD,
H. C. DAKIN.